United States Patent
Yoshida

(10) Patent No.: US 8,065,494 B2
(45) Date of Patent: Nov. 22, 2011

(54) REPRODUCTION DEVICE AND REPRODUCING METHOD

(75) Inventor: Yuji Yoshida, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 554 days.

(21) Appl. No.: 12/030,632

(22) Filed: Feb. 13, 2008

(65) Prior Publication Data

US 2008/0140955 A1 Jun. 12, 2008

Related U.S. Application Data

(63) Continuation-in-part of application No. 11/542,137, filed on Oct. 4, 2006, now abandoned.

(30) Foreign Application Priority Data

Mar. 23, 2006 (JP) .................. 2006-080662
Mar. 16, 2007 (JP) .................. 2007-068754

(51) Int. Cl.
*G06F 12/00* (2006.01)
(52) U.S. Cl. ...................... 711/154; 369/47.3
(58) Field of Classification Search .................. 711/159; 369/47.3
See application file for complete search history.

(56) References Cited

U.S. PATENT DOCUMENTS

| 6,687,860 | B1 | 2/2004 | Iijima et al. | |
| 7,116,618 | B2 * | 10/2006 | Okazaki et al. | 369/53.15 |
| 7,149,177 | B2 * | 12/2006 | Yabuno et al. | 369/275.3 |
| 2003/0189954 | A1 * | 10/2003 | Miki et al. | 370/509 |
| 2004/0136288 | A1 * | 7/2004 | Gushima et al. | 369/47.34 |
| 2004/0252606 | A1 * | 12/2004 | Noda et al. | 369/47.27 |
| 2005/0080984 | A1 * | 4/2005 | Ueda et al. | 711/100 |

FOREIGN PATENT DOCUMENTS

| JP | 2000-183754 A | 6/2000 |
| JP | 2000-293962 A | 10/2000 |
| JP | 2004-039251 A | 2/2004 |

\* cited by examiner

*Primary Examiner* — Hashem Farrokh
(74) *Attorney, Agent, or Firm* — Fujitsu Patent Center

(57) ABSTRACT

A reproduction device for improving reading performance. A storage processing unit includes a detection circuit for detecting a sync code from read data, which includes alternately arranged sync codes and data segments. An analysis circuit analyzes a read status of the sync code detected by the detection circuit. A storage processing circuit adjusts a position at which one of the data segments between two sync codes is stored in a main memory based on the analysis of the analysis circuit.

20 Claims, 14 Drawing Sheets

Fig. 10(a)

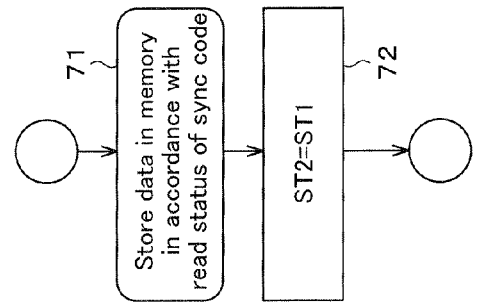

Fig. 10(b)

| ST2 (Previous status) | ST1 (Current status) | Data storage process |
|---|---|---|
| SY_OK | SY_OK | 1st storage process (a) |
| | SYShift_more | 2nd storage process (b) |
| | SYShift_less | 3rd storage process (c) |
| | SY_NOT | 4th storage Process (d) |
| SYShift_more | SY_OK | Process (a) |
| | SYShift_more | Process (b) |
| | SYShift_less | Process (c) |
| | SY_NOT | Process (d) |
| SYShift_less | SY_OK | Process (a) |
| | SYShift_more | Process (b) |
| | SYShift_less | Process (c) |
| | SY_NOT | Process (d) |
| SY_NOT | SY_OK | Process (a) |
| | SYShift_more | Process (b) in accordance with non-detection count |
| | SYShift_less | Process (c) in accordance with non-detection count |
| | SY_NOT | Process (d), store from old data when work memory has no vacant space |
| none | * | Before data reading (no storage data) |

REPRODUCTION DEVICE AND REPRODUCING METHOD

CROSS-REFERENCE TO RELATED APPLICATIONS

This application is a continuation-in-part application of pending U.S. patent application Ser. No. 11/542,137 filed on Oct. 4, 2006, entitled "REPRODUCTION DEVICE AND REPRODUCING METHOD".

BACKGROUND

1. Field

It is related to a reproduction device and a reproducing method, and more particularly, to a device and method for reading information recorded on an optical recording medium.

2. Description of the Related Art

An optical disc is a recording media for recording information with high density. Information is optically read (reproduced) from the optical disc. When a blemish or smear is on the surface of the optical disc, data cannot be accurately read from the optical disc. Further, when the optical disc rotates irregularly during data reading, the amount of data recorded on the disk may differ from the amount of data generated by processing reflection light from the disk. Accordingly, in addition to user data, code information (correction code) for correcting the read data (error correction) is recorded on the optical disc. However, the read data may not be corrected depending on the condition of the read data. Thus, there is a demand for improvements in reading performance of the optical disc.

In the prior art, to improve the reading performance, a correction code calculated for every predetermined amount of user data is recorded on an optical disc, such as a digital video disk or digital versatile disk (DVD). As shown in FIG. 1, a data block BD recorded on an optical disc includes a predetermined amount of user data UD (172 bytes×192 rows (12 rows×16 sectors)), a ten-byte correction code PI for each row of the user data UD calculated from the data in the column direction of the user data UD (B(x, 0) to B(x, 171)), and a sixteen-byte correction code PO (B(192, y) to B(207, y)) for each column calculated from the correction code PI and data in the row direction of the user data UD (B(0, y) to B(191, y)). Some of the correction codes PO are also used as the correction codes PI. The correction codes PI and the correction codes PO are used in error correction (processing for identifying a data error position and calculating a correction value) performed when data is read from the optical disc. The data arrangement sequence (order) of the data block BD is important in the error correction.

In the error correction, each row and column of the data block BD is processed as a codeword, and each column and row undergoes the error correction. More specifically, one data block BD is processed as 208 data rows H0 to H207 or as 182 data columns V0 to V181 as shown in FIG. 1. Errors are corrected in the user data UD and the correction code data PO for each of the data rows H0 to H207 using the user data UD or the correction code data PO and the correction code data PI. Further, errors are corrected in the user data UD and the correction data PO for each of the data columns V0 to V181 using the user data UD or the correction code data PI and the correction code data PO.

As shown in FIG. 2, each of the data rows H192 to H207 for the correction codes PO in the data block BD is inserted (interleaved) between every twelve data rows of the user data UD. One recording sector is constructed by the twelve rows of the user data UD and one row of the correction code data PO. As a result, one data block BD includes sixteen recording sectors C0 to C15.

Data included in the data block BD undergoes eight-to-sixteen modulation. More specifically, eight bits of data, or one byte, is modulated into data having sixteen channel bits (cb). As shown in FIG. 3, one of eight synchronization (sync) codes SY0 to SY7 is added to every 91 bytes (1456 cb) of modulation data. Each sync code has two bytes (32 cb). One sync frame is formed by the 91-byte modulation data and the 2-byte sync code. The sync codes are added to the modulation data in a predetermined order. The sync codes enable identification of the modulation data that is currently being read. The data shown in FIG. 3 is recorded to an optical disc sequentially from the top left. Data is read from the optical disc in order starting from the top left in FIG. 3.

When data is correctly read from the optical disc, a processing circuit receives the read data as a plurality of data segments divided by sync codes as shown in FIG. 4. The processing circuit stores the data segment between two sync codes in a memory 100. When the each data segment reaches 91 bytes, a data block BD (FIG. 1) recorded on the optical disc is stored in the memory. Thus, error correction is accurately performed on the user data with the correction code data PI and the correction code data PO.

A blemish or smear on the surface of the disc or irregular rotation of the disc may result in loss of a sync code or some of the user data. This may also produce excessive data. For example, referring to FIG. 5, when two bytes of data between two sync codes SY5 are missing, the processing circuit stores 91 bytes of data segment (D1) following the former one of the two sync codes SY5 in the memory 100. Then, the processing circuit processes the following two bytes as a sync code and stores the 89 bytes of data segment (D2) following that sync code in the memory 100. When the missing two bytes correspond to the sync code SY1 shown in FIG. 4, the data segment D2 is stored in the memory 100 at a position deviating by two bytes from its correct storage position. Thus, each value in the data segment D2 is processed as an error when the error correction is performed in the direction of the correction code PO. In other words, 91 bytes of data segment are determined as being defective. Such defective data may not be corrected depending on the position or amount of the defective data. In such a case, the entire data block BD is determined as being defective. This lowers the reading performance of the optical disc.

SUMMARY

The embodiment provides a reproduction device and a reproducing method for improving the data reading performance.

The embodiment provides a reproduction device for retrieving read data, including a plurality of sync codes and a plurality of data segments arranged alternately with the sync codes, and for storing the data segments in a first memory in accordance with the sync codes. The reproduction device includes a detection circuit for detecting each of the sync codes from the read data to generate a detection signal. An analysis circuit coupled to the detection circuit analyzes a read status of each of the sync codes with the detection signal to generate an analysis signal. A storage processing circuit coupled to the analysis circuit retrieves one of the data segments between two consecutive sync codes with the analysis signal and adjusts a position at which the one of the data segments is stored in the first memory.

Other embodiments and advantages will become apparent from the following description, taken in conjunction with the accompanying drawings, illustrating by way of example the principles of the invention.

BRIEF DESCRIPTION OF THE DRAWINGS

The objects and advantages may best be understood by reference to the following description of the presently preferred embodiments together with the accompanying drawings in which:

FIG. 10(*a*) is a flowchart showing the operation of the storage processing circuit of FIG. 7;

FIG. 10(*b*) is a schematic diagram showing step 71 of FIG. 10(*a*);

FIG. 11(*b*) is a schematic diagram showing data reading performed by the storage processing circuit of FIG. 7;

FIG. 11(*c*) is a schematic diagram showing data reading performed by the storage processing circuit of FIG. 7;

FIG. 11(*d*) is a schematic diagram showing data reading performed by the storage processing circuit of FIG. 7;

FIG. 12(*b*) is a schematic diagram showing data reading performed by the storage processing circuit of FIG. 7;

FIG. 12(*c*) is a schematic diagram showing data reading performed by the storage processing circuit of FIG. 7;

FIG. 12(*d*) is a schematic diagram showing data reading performed by the storage processing circuit of FIG. 7;

FIG. 14(*b*) is a schematic diagram showing the data structure for a Blu-ray Disc (trademark).

DETAILED DESCRIPTION OF THE PREFERRED EMBODIMENTS

Figure 1:
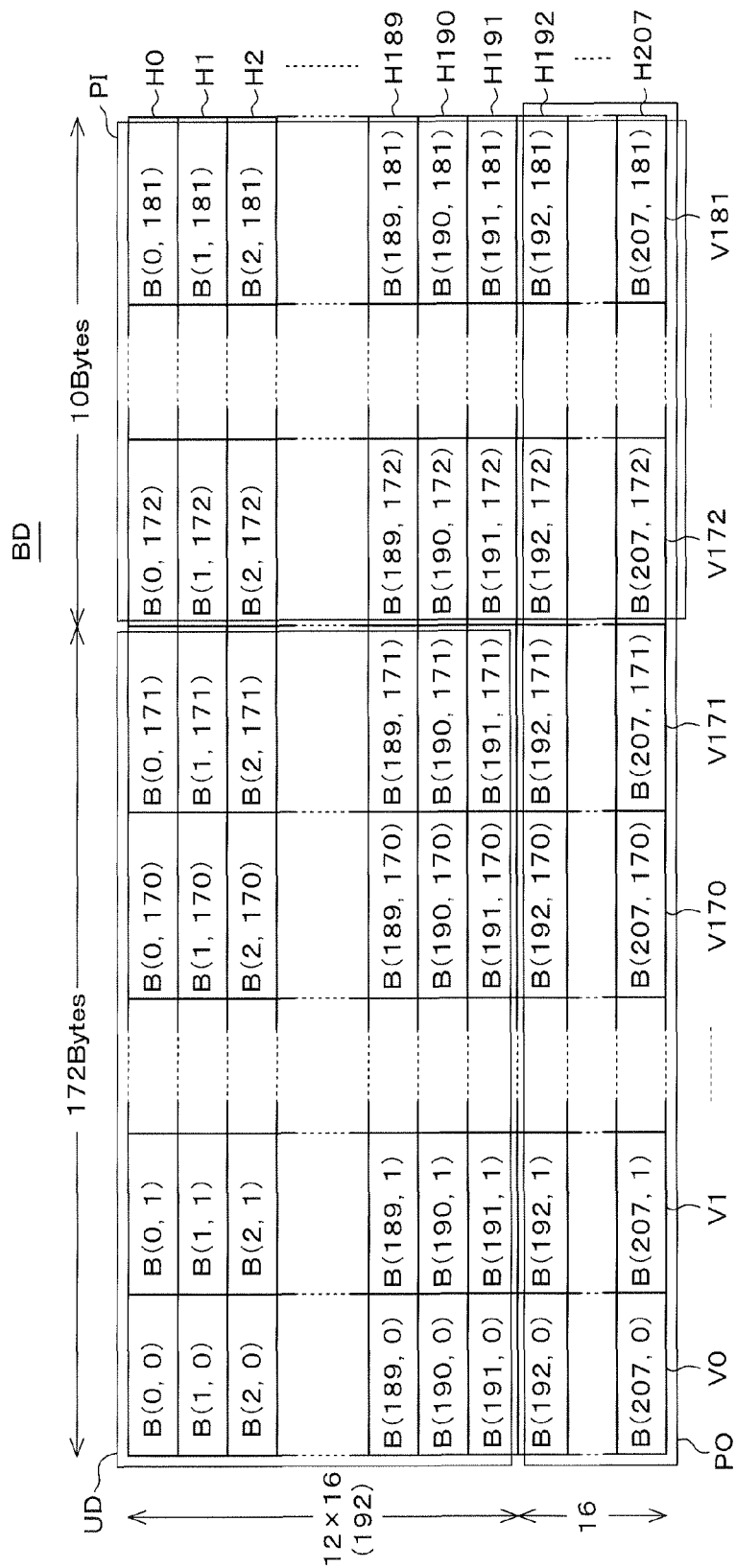
FIG. 1 is a schematic diagram showing the data structure of a data block including user data and error correction codes.
Figure 2:
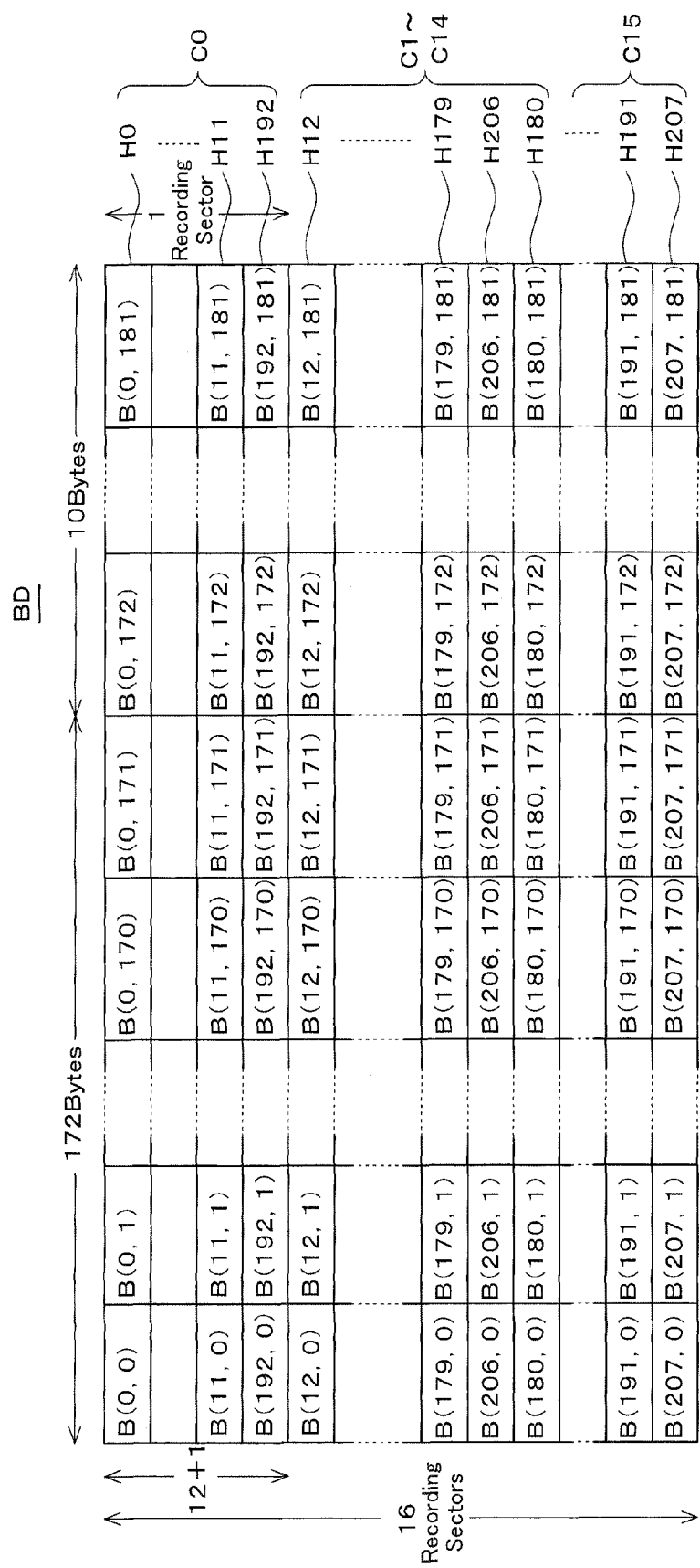
FIG. 2 is a schematic diagram showing the data structure of recording sectors in a DVD.

In the drawings, like numerals are used for like elements throughout.

Figure 6:
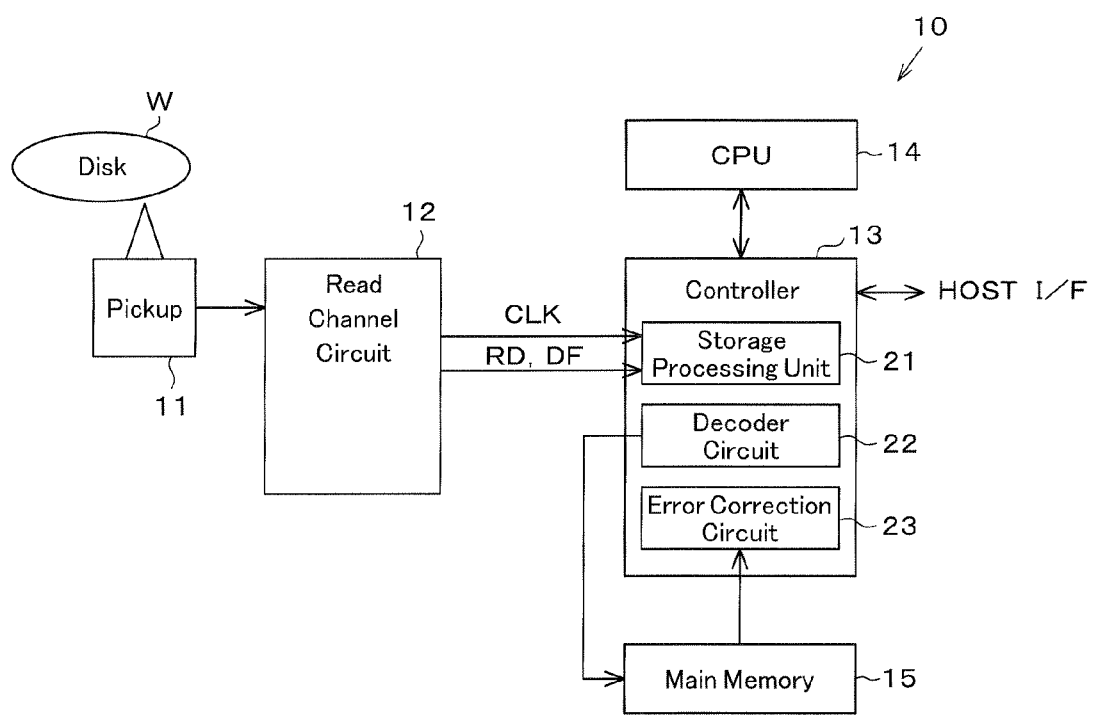
FIG. 6 is a schematic block diagram of a reproduction device according to a preferred embodiment.

A reproduction device 10 according to a preferred embodiment will now be described with reference to the drawings. FIG. 6 is a schematic block diagram of the reproduction device 10.

The reproduction device 10 reads data recorded on an optical disc W, which functions as a recording medium.

The disc W is rotated by a drive device (not shown). A pickup 11 is arranged to face the disc W. The pickup 11 is moved by a drive device (not shown) in the radial direction of the disc W. The pickup 11 radiates the disc W with light having a predetermined wavelength and converts reflection light from the disc W into an electric signal to generate an output signal. A read channel circuit 12 converts the output signal of the pickup 11 to binary data to generate a data signal (read data RD) and provides a controller 13 with the read data RD. Further, the read channel circuit 12 provides the controller 13 with a defect signal DF when a significant defect is detected in a reproduction signal (read data RD). The controller 13 is controlled by a CPU 14.

Figure 3:
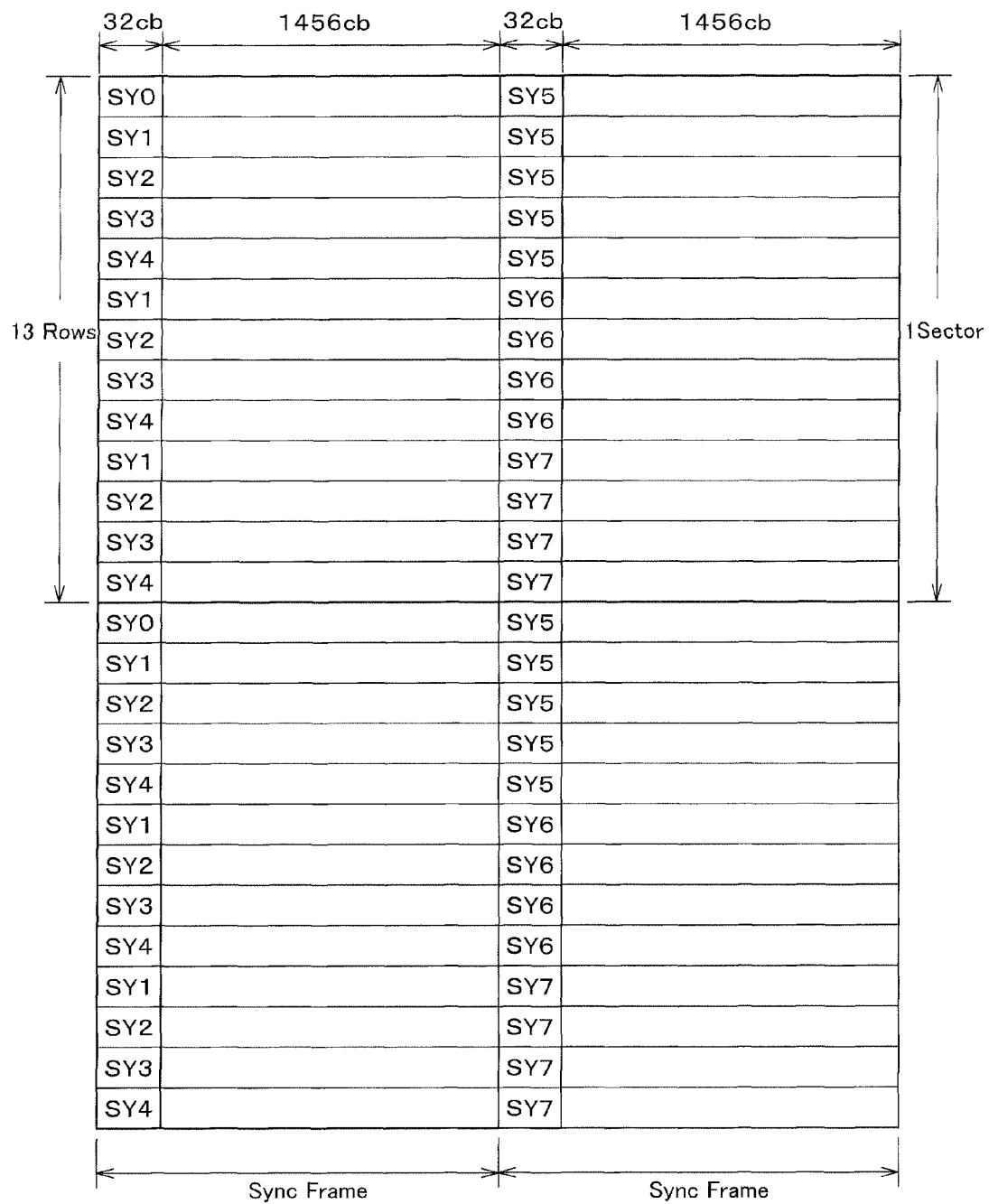
FIG. 3 is a schematic diagram showing the data structure of data recorded on a DVD.
Figure 4:
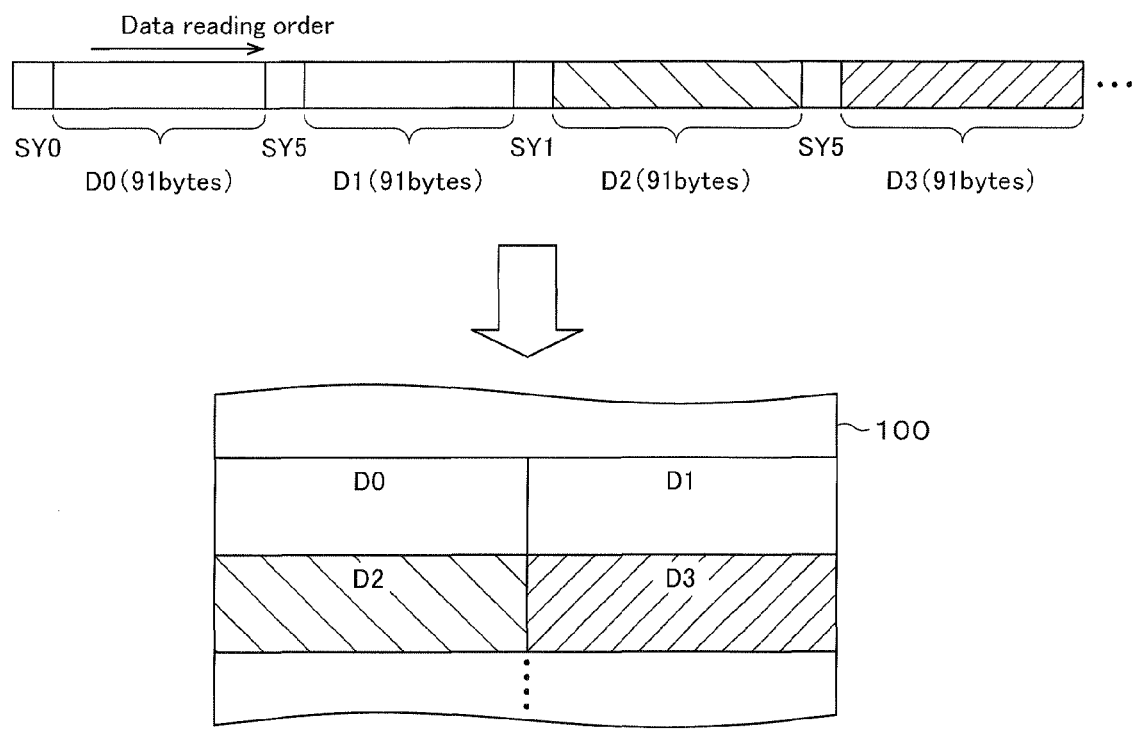
FIG. 4 is a schematic diagram showing a data reading operation in the prior art.
Figure 5:
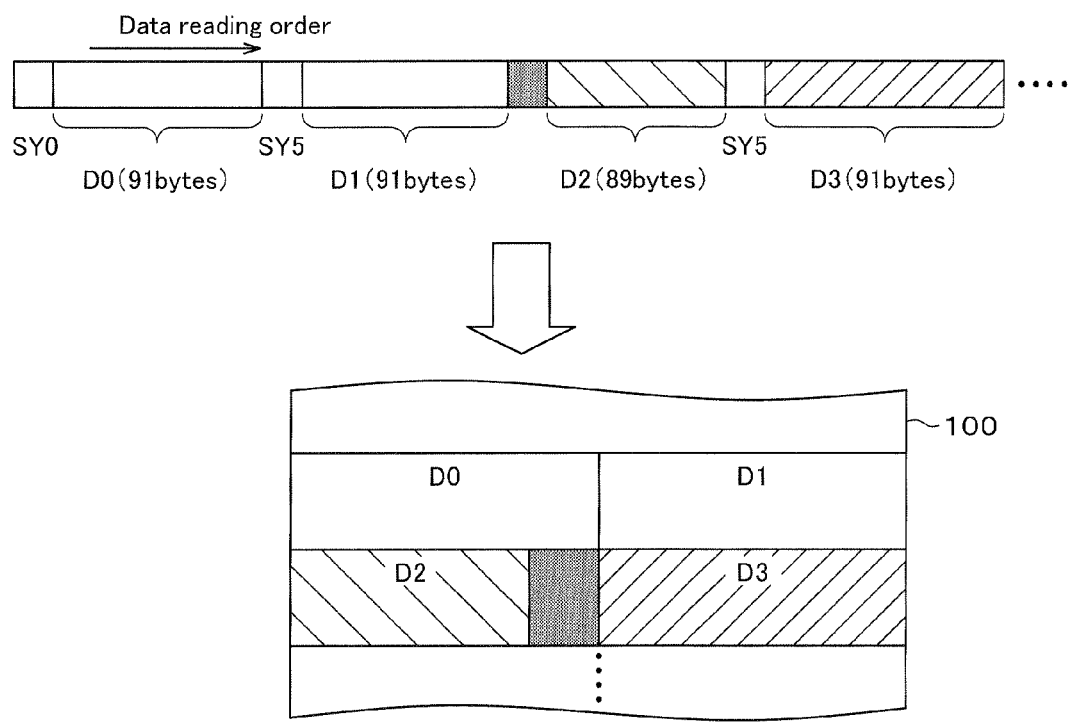
FIG. 5 is a schematic diagram showing a data reading operation in the prior art.

In the preferred embodiment, the read data includes a plurality of sync codes and modulation data. The modulation data is divided into a plurality of data segments. The sync codes and the data segments are arranged alternately. Each sync code corresponds to one of the eight sync codes SY0 to SY7 shown in FIG. 3. Each data segment has 91 bytes (1456 cb) as shown in FIG. 3. Each data segment is generated by modulating the data block BD shown in FIG. 1 (including the user data UD, the first correction codes PI, and the second correction codes PO).

The controller 13 includes a storage processing unit 21, a decoder circuit 22, and an error correction circuit 23. The controller 13 generates data based on the data signal provided from the read channel circuit 12 and stores the data segments into a main memory 15 (first memory). The controller 13 then performs error correction on a single block of data stored in the main memory 15 and provides a host apparatus (not shown) with the user data.

The storage processing unit 21 detects a sync code from the read data. Based on the detection, the storage processing unit 21 adjusts the storage position of the data segment stored in the main memory 15 and generates adjustment data. In detail, the storage processing unit 21 analyzes the read status of the detected sync code. Based on the analysis, the storage processing unit 21 determines how to store the data segment that has been read before detection of the sync code. In accordance with the determination, the storage processing unit 21 generates the adjustment data from the read data. For example, when determining from the read status of the sync code that the head of the data segment that is to be stored in the main memory 15 is missing, the storage processing unit 21 adds dummy data to the data segment head. The amount of the dummy data is equal to the amount of the missing data. This prevents the entire data from being stored at erroneous positions and increases the amount of data stored at correct positions. In other words, the amount of data that needs correction decreases. Thus, the error correction accuracy is increased, and the data reading performance may be improved.

The decoder circuit 22 generates demodulation data by performing eight-to-sixteen demodulation on the data segment of which storage position has been adjusted by the storage processing unit 21 and stores the demodulation data in the main memory 15. The storage processing unit 21 adjusts the position for storing the data provided to the decoder circuit 22. This stores a specified amount of data at correct positions in the memory 15.

The error correction circuit 23 performs error correction on single blocks of data stored in the main memory 15. The error correction circuit 23 determines the position and correction value of a data error with the correction code data PI and the correction code data PO added to the user data UD and rewrites the erroneous data in the main memory 15. For example, referring to FIG. 1, the first two bytes of data row H0 of left block (B(0, 0) to B(0, 90)) for one sync frame data (91 bytes) may be missing. In this case, with the prior art technique, the correctly received 89 bytes of data is sequentially stored from the left end (B(0, 0)), and predetermined data (e.g., "0") is stored in the area for two bytes at the right end (B(0, 90)). In this case, the entire data row H0 of left block is processed as an error. In the preferred embodiment, the storage position of the missing data is adjusted. For example, the storage positions of the 89 bytes of data of the data row H0 of left block are determined by aligning the end of the data with the right end (B(0, 90)) of the storage area. In this case, only the first two bytes of data are processed as an error. More specifically, the amount of error data is 91 bytes in the prior art, whereas the amount of error data is reduced to two bytes in the preferred embodiment. This may improve the data reading performance.

The structure of the storage processing unit 21 will now be described.

Figure 7:
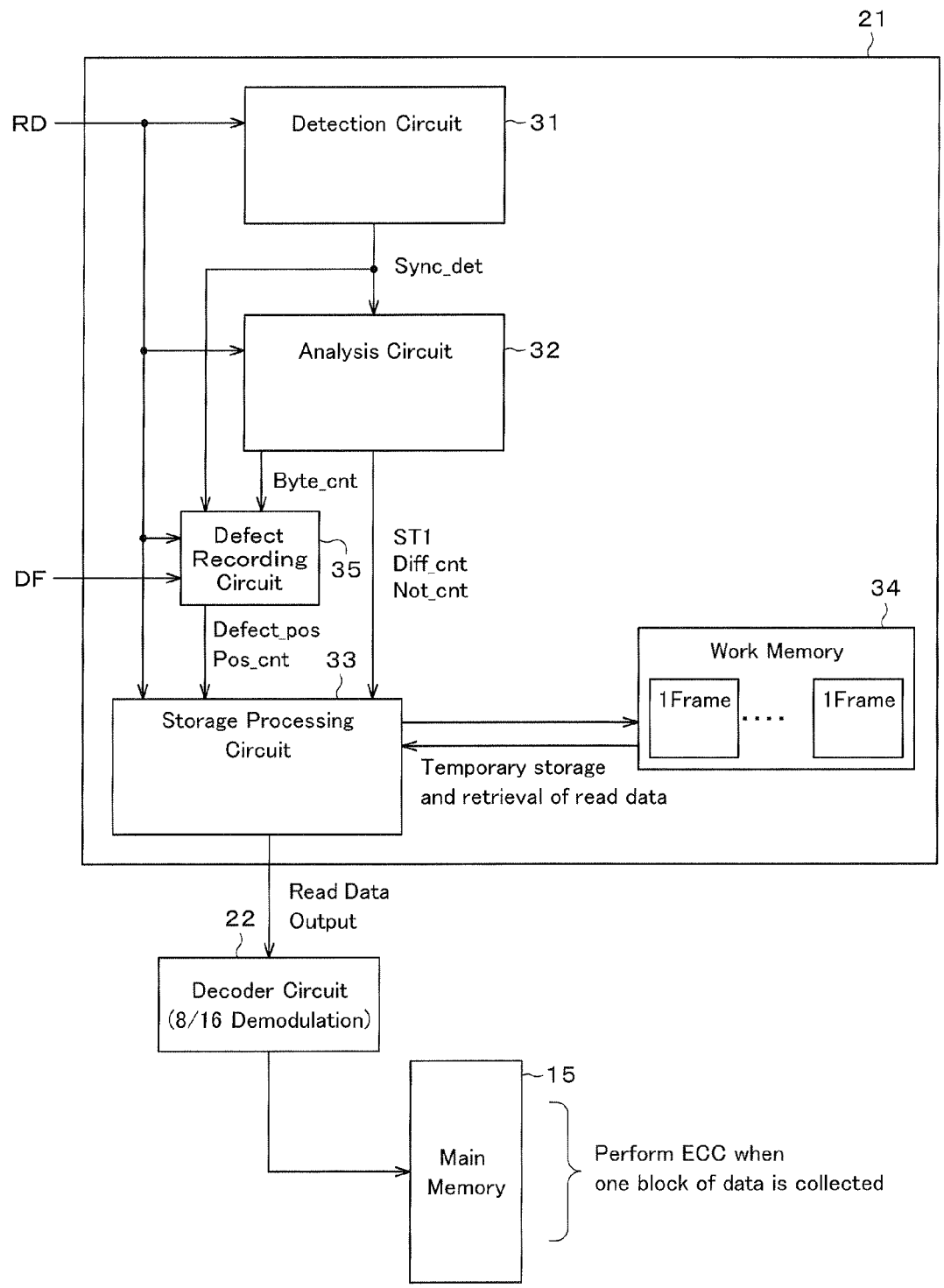
FIG. 7 is a schematic block diagram of a storage processing circuit shown in FIG. 6.

As shown in FIG. 7, the storage processing unit 21 includes a detection circuit 31, an analysis circuit 32, a defect recording circuit 35, a storage processing circuit 33, and a work memory 34 (second memory). The detection circuit 31 detects a sync code from the read data RD and generates a detection signal Sync_det. The analysis circuit 32 analyzes the read status of the detected sync code based on the read data RD and the detection signal Sync_det to generate an analysis signal. The position of the sync code is predetermined by a standard. The standard specifies that 91 bytes of data are arranged between two sync codes. The read data is generated through eight-to-sixteen modulation and has 16 channel bits (cb). Each sync code has two bytes (32 cb).

The analysis circuit 32 analyzes the read status of a sync code based on the number of bytes of the read data RD between two sync codes. For example, when the detection circuit 31 detects a first sync code, the analysis circuit 32 starts counting the number of bytes of the data following the first sync code. Then, when the detection circuit 31 detects a second sync code, the analysis circuit 32 determines whether the count value of the read data RD between the first and second sync codes is equal to a predetermined value (91 bytes). When the count value is equal to the predetermined value, the analysis circuit 32 determines that the second sync code has been detected at an expected position. In other words, the analysis circuit 32 determines that the data segment has 91 bytes between the first and second sync codes. When the count value is not equal to the predetermined value, the analysis circuit 32 determines that part of the data segment is missing, a sync code is missing between the detected first and second sync codes, or that excessive data is included between the first and second sync codes. In this way, the analysis circuit 32 analyzes the read status of the second sync code. The storage processing circuit 33 adjusts the storage position of the read data RD in the main memory 15 in accordance with the read status of the sync code analyzed by the analysis circuit 32. As a result, the read data RD is stored at the correct positions.

The analysis circuit 32 generates a status ST1 (analysis signal), a position difference Diff_cnt, and a code non-detection count Not_cnt. The position difference Diff_cnt and the code non-detection count Not_cnt indicate count values of predetermined counters. The status ST1 indicates the read status of a sync code, which are classified as a first status (SY_OK), a second status (SYShift_more), a third status (SYShift_less), and a fourth status (SY_NOT). The first status means indicates that a sync code has been detected at its expected position (position determined by the standard). The second status indicates that a sync code has been detected behind an expected position of the sync code. The third status indicates that a sync code has been detected in front of an expected position of the sync code. The fourth status indicates that a sync code has not been detected in a predetermined detection range including the expected position of the sync code, or in the frame that is currently being read. The position difference Diff_cnt indicates the difference (in byte number) between an expected position and actual detection position of a sync code. The code non-detection count Not_cnt indicates the number of frames in which a sync code has not been detected.

The defect recording circuit 35 is provided with the read data RD, the sync code detection signal Sync_det, a byte count Byte_cnt, and the defect signal DF. The defect signal DF is output when the disc reproduction signal includes a significant defect caused by scratches or dust. When a defect is included in the read data RD between the previously detected sync code and the sync code that is detected next, the defect recording circuit 35 stores the position of the defect and the number of times the defect is detected based on the defect signal DF. Then, the defect recording circuit 35 records position information Defect_pos[Pos_cnt], which indicates the position of the defect, and a defect detection count Pos_cnt.

The storage processing circuit 33 stores read data RD in the work memory 34. The work memory 34 has a capacity for enabling storage of plural frames of the read data RD. Each frame corresponds to a sync frame (refer to FIG. 3) having 93 bytes, which includes a sync code (two bytes) and data segment (91 bytes).

The storage processing circuit 33 retrieves data segment from the work memory 34 based on the analysis signal and adjusts the storage position of the data segment that is to be stored in the memory 15 to generate adjustment data. As one example, when the status ST1 indicates the first status (SY_OK), the storage processing circuit 33 directly uses one frame of the data segment in the work memory 34 as one frame of adjustment data. As another example, when the status ST1 indicates the third status (SYShift_less), the storage processing circuit 33 adds dummy data to the head of the data segment in the work memory 34 that has less bytes than one frame to adjust the storage position of the data segment stored in the memory 15 and generate one frame of adjustment data. The dummy data is, for example, "0" data added by performing zero padding. The storage processing circuit 33 performs zero padding to add "0" for the number of bytes corresponding to the position difference Diff_cnt to the data segment stored in the work memory 34. The storage processing circuit 33 then adjusts the storage position of the data segment stored in the main memory 15 so that the number of bytes of the data segment stored in the work memory 34 and the number of bytes of the dummy data total to become equal to the number of bytes for one frame.

Figure 8:
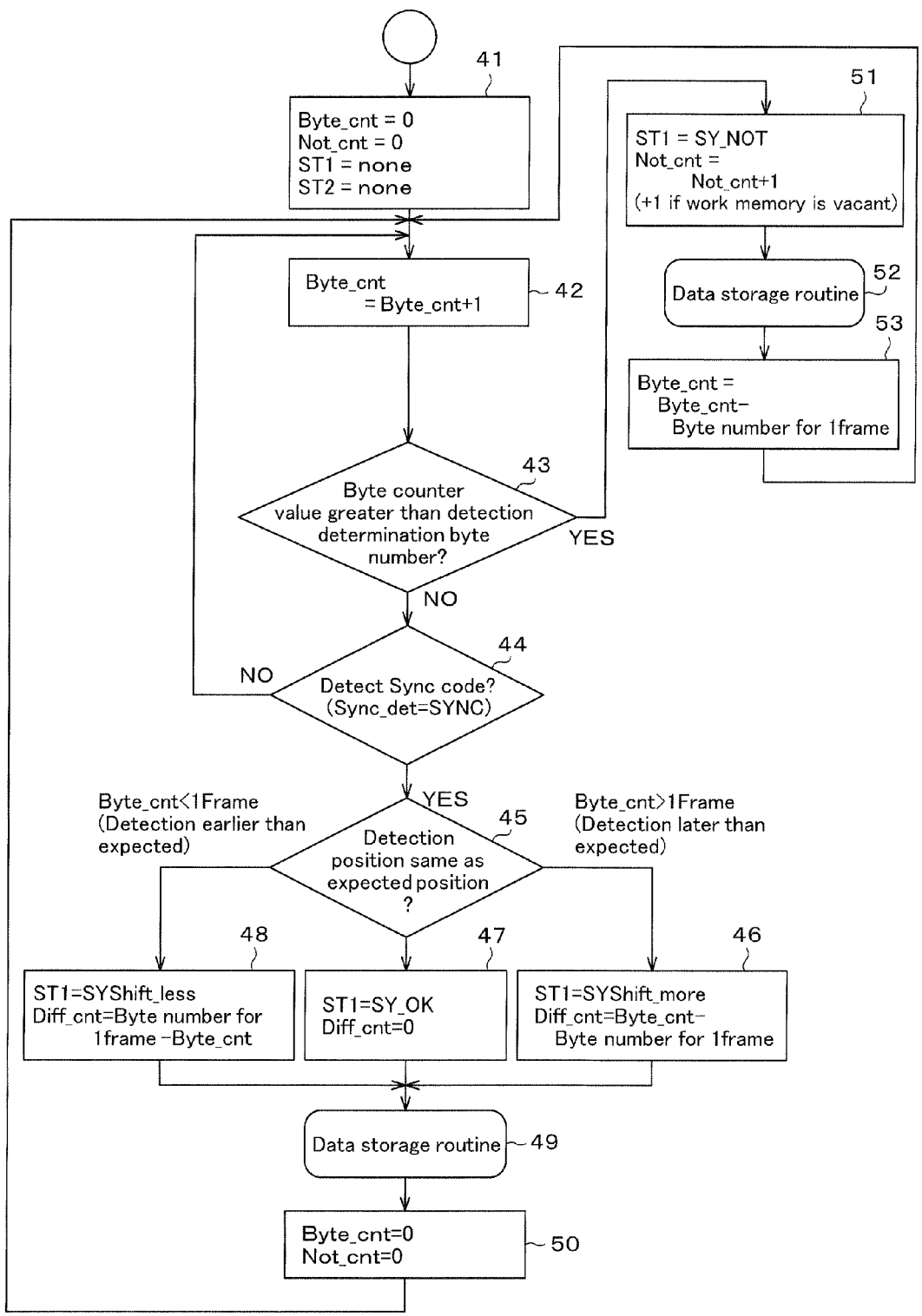
FIG. 8 is a schematic flowchart of the operation of an analysis circuit shown in FIG. 7.

FIG. 8 is a flowchart schematically illustrating the operation of the analysis circuit 32 shown in FIG. 7.

In step 41, the analysis circuit 32 performs an initialization process. In the initialization process, the analysis circuit 32 clears (sets to zero) the byte count Byte_cnt and the code non-detection count Not_cnt for each frame and sets each of status ST1 and previous status ST2 to an initial state (none). The previous status ST2 indicates the status immediately preceding the status ST1.

In step 42, the analysis circuit 32 counts up (+1) the byte count Byte_cnt when provided with one byte of read data. In step 43, the analysis circuit 32 determines whether the byte count Byte_cnt exceeds a detection determination byte number (sum of number of bytes for one frame and number of bytes for determining code non-detection). The code non-detection determination byte number corresponds to a detection range (byte number) in which a sync code is expected to be detected. The analysis circuit 32 detects a sync code from read data within a detection range that extends from an expected position of the sync code to a position separated from the expected position by the code non-detection determination byte number. When the byte count Byte_cnt does not exceed the detection determination byte number (NO), the analysis circuit 32 proceeds to step 44.

In step 44, the analysis circuit 32 determines whether a sync code (SYNC) has been detected based on a detection signal Sync_det. The analysis circuit 32 proceeds to step 45 when a sync code is detected (YES) and proceeds to step 42 when a sync code is not detected (NO).

In step 45, the analysis circuit 32 determines whether the detection position of the sync code is the same as the expected position based on the byte count Byte_cnt. The analysis circuit 32 proceeds to step 46 when the byte count Byte_cnt is greater than the number of bytes of one frame (Byte_cnt> the number of bytes of one frame). The analysis circuit 32 proceeds to step 47 when the byte count Byte_cnt is equal to the number of bytes of one frame (Byte_cnt=the number of bytes of one frame). The analysis circuit 32 proceeds to step 48 when the byte count Byte_cnt is less than the number of bytes of one frame (Byte_cnt<the number of bytes of one frame).

In step 46, the analysis circuit 32 changes the status ST1 to indicate the second status (SYShift_more), subtracts the number of bytes of one frame from the byte count Byte_cnt, and sets the value indicating the subtraction result as the position difference Diff_cnt.

In step 47, the analysis circuit 32 changes the status ST1 to indicate the first status (SY_OK) and clears the position difference Diff_cnt (=0).

In step 48, the analysis circuit 32 changes the status ST1 to indicate the third status (SYShift_less), subtracts the byte count Byte_cnt from the number of bytes of one frame, and sets the value indicating the subtraction result as the position difference Diff_cnt.

When the processing of steps 46, 47, or 48 is completed, the analysis circuit 32 proceeds to step 49. In step 49, the analysis circuit 32 instructs the storage processing circuit 33 to start a data storage process. In step 50, the analysis circuit 32 clears the byte count Byte_cnt and the code non-detection count Not_cnt and proceeds to step 42.

In step 43 described above, when the byte count Byte_cnt exceeds the detection determination byte number (YES), the analysis circuit 32 proceeds to step 51.

In step 51, the analysis circuit 32 changes the status ST1 to indicate the fourth status (SY_NOT). Further, the analysis circuit 32 counts up (+1) the code non-detection count Not_cnt if the work memory 34 has a vacant area. In step 52, the analysis circuit 32 instructs the storage processing circuit 33 to start the data storage process. Next, in step 53, the analysis circuit 32 subtracts the number of bytes of one frame from the byte count Byte_cnt and sets the value indicating the subtraction result as the byte count Byte_cnt. The analysis circuit 32 then proceeds to step 42.

The operation of the defect recording circuit 35 will now be described.

Figure 9:
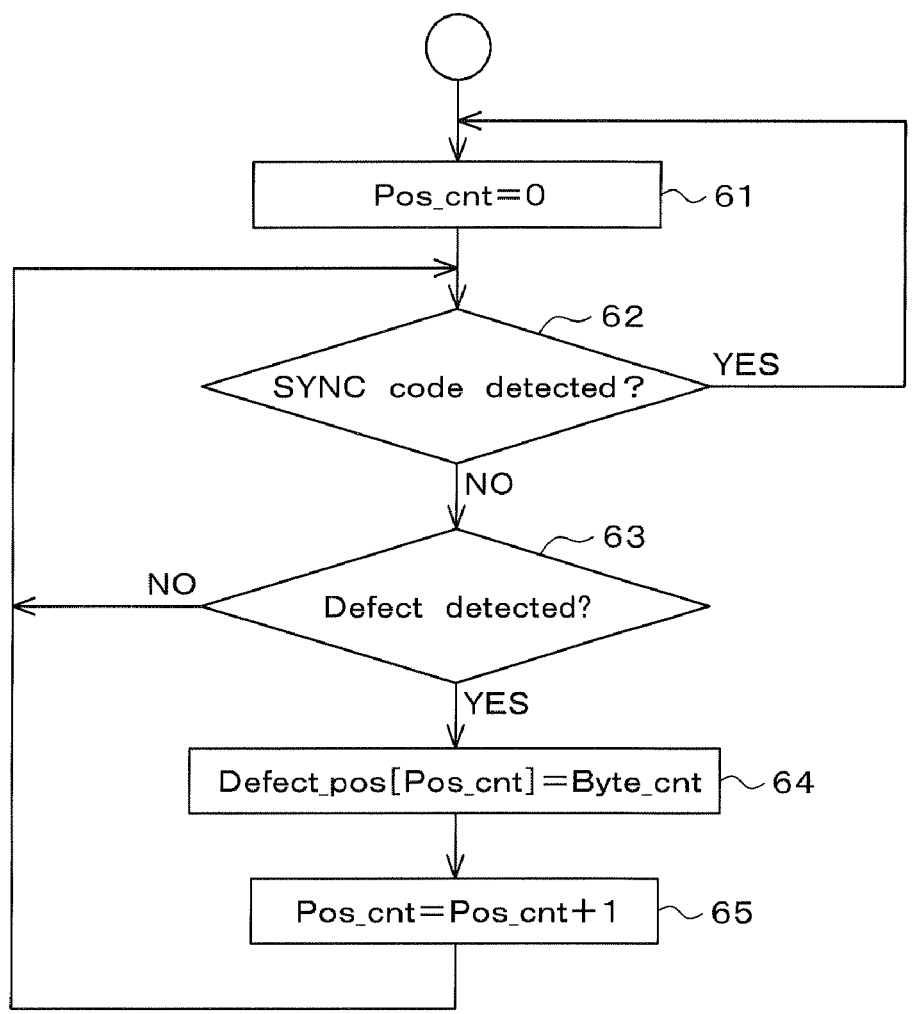
FIG. 9 is a schematic flowchart of the operation of an defect recording circuit shown in FIG. 7.

FIG. 9 is a flowchart showing the operation of the defect recording circuit 35.

In step 61, the defect recording circuit 35 performs an initialization process. In this process, the value of the counter Pos_cnt, which indicates the number of times the defect signal DF has been detected, is cleared.

In step 62, the defect recording circuit 35 determines whether or not the synch code (SYNC) has been detected based on the detection signal Sync_det output from the detection circuit 31. When the detection signal Sync_det is detected (step 62: YES), the defect recording circuit 35 proceeds to step 61. When the detection signal Sync_det is not detected (step 62: NO), the defect recording circuit 35 proceeds to step 63.

In step 63, the defect recording circuit 35 determines whether or not a defect has been detected based on the defect signal DF. When a defect is detected (step 63: YES), the defect recording circuit 35 proceeds to step 64. When a defect is not detected (step 63: NO), the defect recording circuit 35 proceeds to step 62.

In step 64, based on the byte counter Byte_cnt output from the status analysis circuit 32, the defect recording circuit 35 sets the byte count value for when the defect signal DF is detected as the position information Defect_pos[Ps_cnt].

In step 65, the defect recording circuit 35 increments by +1 the counter Pos_cnt and then proceeds to step 62. The counter Pos_cnt is counted up by 1 whenever the defect signal DF indicates defect detection. Accordingly, the counter Pos_cnt indicates the number of times a defect is detected, that ism the number of defects in the read data RD between two sync codes.

In this manner, based on the defect signal DF, the defect recording circuit 35 sets the position of defects in the read data RD between two sync codes as the position information Defect_pos[Pos_cnt] and sets the number of times the defects are detected as the counter Pos_cnt.

The operation of the storage processing circuit 33 will now be described.

FIG. 10(a) is a schematic flowchart illustrating the operation of the storage processing circuit 33 shown in FIG. 7. FIG. 10(b) is a schematic diagram showing the processing of step 71 in FIG. 10(a).

In step 71, the storage processing circuit 33 receives an analysis signal from the analysis circuit 32, and stores data (data segment) in the main memory 15 via the decoder circuit 22 in accordance with the current status ST1 included in the received analysis signal and the previous status ST2.

The processing of step 71 performed when the previous status ST2 indicates the first status (SY_OK) will now be discussed.

When the current status ST1 indicates the first status (SY_OK), the storage processing circuit 33 executes a first data storage process (a). In the first status, exactly one frame (91 bytes) of read data is stored in the work memory 34. Thus, the storage processing circuit 33 directly stores the one frame of read data corresponding stored in the work memory 34 at predetermined addresses in a memory space.

When the current status ST1 indicates the second status (SYShift_more), the storage processing circuit 33 executes a second data storage process (b). In the second status, read data having more bytes than one frame is stored in the work memory 34. The storage processing circuit 33 stores a predetermined amount (one frame of) read data in the main memory 15 through one of the following processes (A1), (A2), and (A3), preferably process (A3) and deletes an excessive data exceeding the predetermined amount.

(A1) The storage processing circuit 33 stores the read data in the main memory 15 sequentially from the data end, which is adjacent to the current sync code. When doing so, the storage processing circuit 33 sequentially stores the read data from the final address of the predetermined memory space.

(A2) The storage processing circuit 33 sequentially stores the read data in the main memory 15 from the data head, which is adjacent to the preceding sync code. When doing so, the storage processing circuit 33 stores the read data from the first address of the predetermined memory space.

(A3) The storage processing circuit 33 stores the read data in the main memory 15 using both processes (A1) and (A2). More specifically, when storing the read data between the two sync codes, the storage processing circuit 33 stores the head portion of the read data from the first address of the predetermined memory space and stores the final portion of the read data from the final address of the predetermined memory address.

In the second data storage process (b), the number of bytes of the read data RD stored sequentially from the final address is determined by a user setting or the position information Defect_pos[Pos_cnt](Pos_cnt=0, 1, 2, . . . ) that is based on the defect signal DF.

When the current status ST1 indicates the third status (SY-Shift_less), the storage processing circuit 33 executes a third data storage process (c). In the third status, read data having bytes less than one frame is stored in the work memory 34. In the third data storage process (c), the storage processing circuit 33 stores the read data in the memory 15 through one of processes (A1), (A2), and (A3) described above, preferably through process (A3), and performs zero padding to compensate for the missing data. As a result, data having the predetermined number of bytes (corresponding to one frame) is stored in the main memory 15. In the third data storage process (c), the number of bytes of the read data RD stored sequentially from the final address is determined by a user setting or the position information Defect_pos[Pos_cnt] (Pos_cnt=0, 1, 2, . . . ) that is based on the defect signal DF.

When the current status ST1 indicates the fourth status (SY_NOT), the storage processing circuit 33 executes a fourth data storage process (d) and stores the read data in the work memory 34.

The storage processing circuit 33 sets the current status ST1 as the previous status ST2 in step 72 after storing the read data in the main memory 15 or in the work memory 34.

FIGS. 11(a), 11(b), 11(c), and 11(d) are schematic diagrams showing a reading operation being performed when the status ST2 indicates the first status (SY_OK). In FIGS. 11(a), 11(b), 11(c), and 11(d), broken lines indicate positions at which sync codes are expected to be detected.

Figure 11:
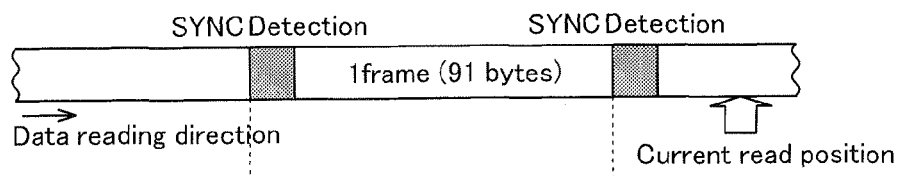
FIG. 11(*a*) is a schematic diagram showing data reading performed by the storage processing circuit of FIG. 7.
Figure 11:
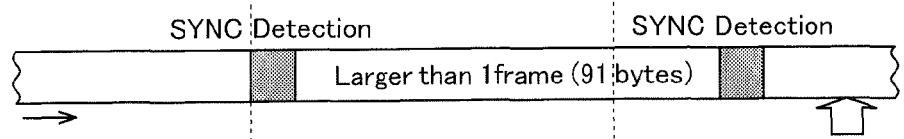
Figure 11:
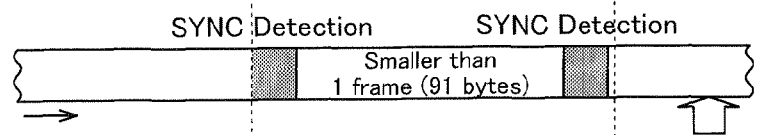
Figure 11:
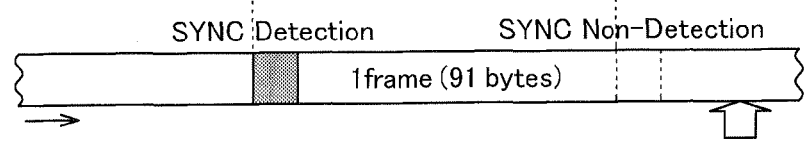
Figure 12:
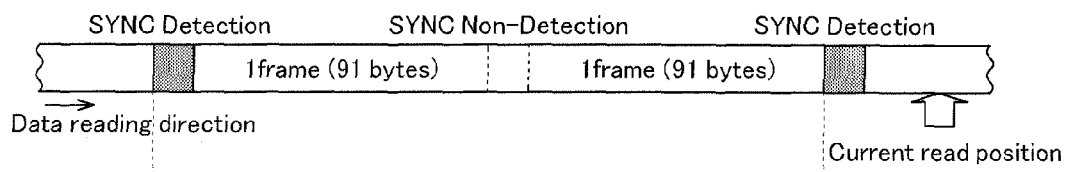
FIG. 12(*a*) is a schematic diagram showing data reading performed by the storage processing circuit of FIG. 7.
Figure 12:
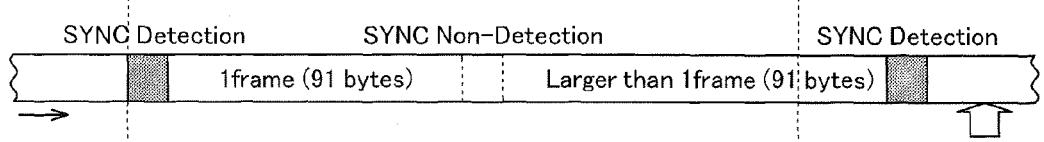
Figure 12:
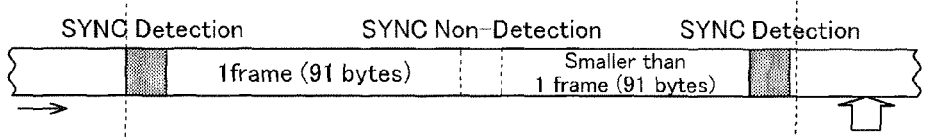
Figure 12:
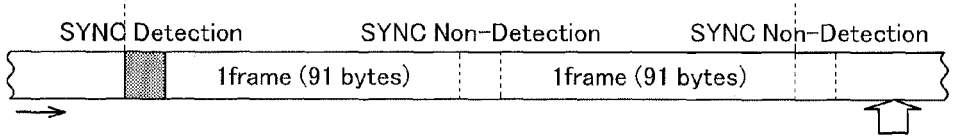

As shown in FIG. 11(a), when the current status ST1 indicates the first status (SY_OK), that is, when one frame (91 bytes) of read data exists between two sync codes, the storage processing circuit 33 performs the first storage process (a) to store the data in the main memory 15.

As shown in FIG. 11(b), when the current status ST1 indicates the second status (SYShift_more), that is, when more than one frame of read data exists between the two sync codes, the storage processing circuit 33 performs the second storage process (b) to store data in the main memory 15.

As shown in FIG. 11(c), when the current status ST1 indicates the third status (SYShift_less), that is, when less than one frame of read data exists between the two sync codes, the storage processing circuit 33 performs the third storage process (c) to store data in the main memory 15.

As shown in FIG. 11(d), when the current status ST1 indicates the fourth status (SY_NOT), that is, when a sync code is not detected, the storage processing circuit 33 performs the fourth storage process (d) to temporarily store data following the previous sync code in the work memory 34.

FIGS. 12(a), 12(b), 12(c), and 12(d) are schematic diagrams of a reading operation performed when the status ST1 indicates the fourth status (SY_NOT), that is, when a sync code is undetected. In this case, one sync code is not detected (as shown by the broken lines in the middle of FIG. 12). Thus, the code non-detection count Not_cnt is set at 1. The work memory 34 stores at least one frame of read data (refer to FIG. 11(d)). In FIGS. 12(a), 12(b), 12(c), and 12(d), broken lines indicate positions at which sync codes are expected to be detected.

As shown in FIG. 12(a), when the current status ST1 indicates the first status ((SY_OK), read data having a predetermined number of bytes (two frames of data in this case) and an undetected sync code are included between two sync codes. Thus, based on the code non-detection count Not_cnt, the storage processing circuit 33 reads one frame of data from the work memory 34 and stores the read data at a predetermined address in the main memory 15. Further, the storage processing circuit 33 stores one frame of the newest read data at a predetermined address in the main memory 15.

As shown in FIG. 12(b), when the current status ST1 indicates the second status (SYSift_more), the storage processing circuit 33 stores one frame of read data, which is stored in the work memory 34, in the main memory 15 in accordance with the code non-detection count Not_cnt. More specifically, the storage processing circuit 33 stores the first frame of data adjacent to the preceding sync code sequentially from the first address of the predetermined memory space. Further, the storage processing circuit 33 stores the newest read data, which is larger than one frame, in the main memory 15 sequentially from the final data adjacent to the current sync code. When doing so, the storage processing circuit 33 sequentially stores the newest read data from the final address of the predetermined memory space. The storage processing circuit 33 then deletes unnecessary data.

As shown in FIG. 12(c), when the current status ST1 indicates the third status (SYShift_less), the storage processing circuit 33 stores one frame of read data, which is stored in the work memory 34, in the main memory 15 in accordance with the code non-detection count Not_cnt. More specifically, the storage processing circuit 33 stores the first frame of data adjacent to the preceding sync code sequentially from the first address of the predetermined memory space. Further, the storage processing circuit 33 sequentially stores the newest read data, which is smaller one frame, in the main memory 15 sequentially from the final data adjacent to the current sync code. When doing so, the storage processing circuit 33 stores the newest read data sequentially from the final address of the predetermined memory space. The storage processing circuit 33 then performs zero padding to compensate for the missing data.

As shown in FIG. 12(d), when the current status ST1 indicates the fourth status (SY_NOT), the storage processing circuit 33 temporarily stores read data of the preceding frame in the work memory 34. In this state, the work memory 34 stores two frames of data.

Figure 13:
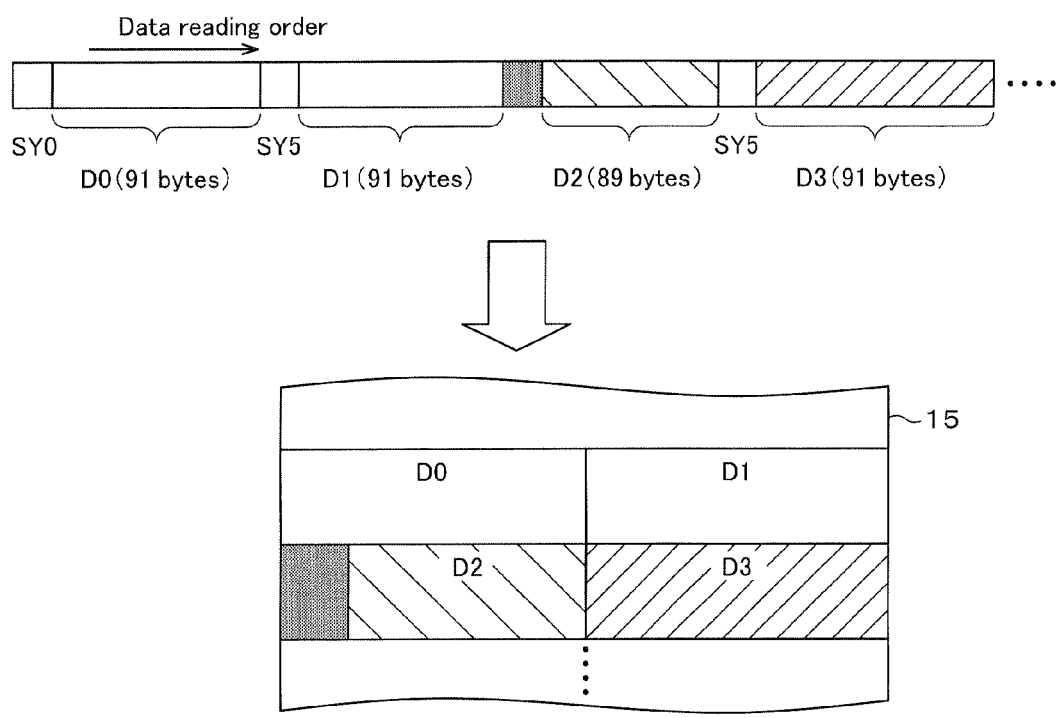
FIG. 13 is a schematic diagram showing a data storage process performed by the storage processing circuit of FIG. 7.

FIG. 13 is a schematic diagram showing a data storage operation corresponding to the reading operation of FIG. 12(c). Data D1 and D2 and an undetected sync code are included between two sync codes SY5. When the amount of data D2 is smaller than the specified amount, the data D2 is sequentially stored in a predetermined memory space of the main memory 15 from the last address in accordance with the byte number indicated by the byte count Byte_cnt. Zero padding is performed to add "0" to the head of the data D2.

In the preferred embodiment, when data of the first two bytes is missing in a frame, data of the remaining 89 bytes is stored at correct positions in the main memory 15. When data of two bytes in the middle of one frame is missing, the data following the missing two bytes up to the detected sync code is stored at correct positions in the main memory 15. Thus, the amount of data stored at correct positions is greater in the preferred embodiment than in the prior art example in which one frame of data is entirely stored at incorrect positions. As a result, the reading performance is higher in the present embodiment.

The reproduction device 10 of the preferred embodiment has the advantages described below.

(1) The detection circuit 31 detects a sync code included in read data. The analysis circuit 32 analyzes the read status of the detected sync code. The storage processing circuit 33 adjusts the storage position at which data segment between two sync codes is stored. As a result, the amount of data stored at correct positions increases. This may improve the reading performance.

(2) The storage processing circuit 33 adjusts the number of bytes in the read data to a predetermined number (specified value) by adding dummy data to the read data when a sync code is detected at a position in front of an expected position of the sync code. The storage processing circuit 33 then stores the read data in the predetermined memory space based on at least one of the two sync codes through the first process (A1) of storing the read data from the head, the second process (A2) of storing the read data from the end, or the third process (A3) of combining the first and second processes. Even when, for example, irregular rotation of the optical disc causes the read data to be lost partially, the amount of data stored at correct positions (particularly at positions close to sync codes) increases. This may improve the reading performance.

(3) The storage processing circuit 33 stores data having a predetermined number of bytes (specified value) in the main memory 15 through one of the first to third processes (A1), (A2), and (A3) based on at least one of the two sync codes when a sync code is detected at a position behind an expected position of the sync code. The storage processing circuit 33 deletes excessive data exceeding the predetermined number of bytes. Accordingly, when, for example, irregular rotation of an optical disc generates excessive data on the disc, the amount of data stored at correct positions (particularly at positions close to sync codes) increases. This may improve the reading performance.

(4) The storage processing circuit 33 temporarily stores the read data in the work memory 34 when a sync code is not detected in a predetermined detection range. The storage processing circuit 33 then stores the read data, which is stored in the work memory 34, in the main memory 15 based on a sync code detected afterward and the code non-detection count Not_cnt. Accordingly, the amount of data stored at correct positions increases and the reading performance may improve even when a sync code is not detected.

(5) The storage position of the data segment stored in the main memory 15 is adjusted. The adjustment reduces the amount of data that is determined as being an error during error correction. As a result, the reading performance may be improved.

It should be apparent to those skilled in the art that the aforementioned embodiment may be embodied in many other specific forms without departing from the spirit or scope of the embodiment. Particularly, it should be understood that the embodiment may be embodied in the following forms.

The amount of data stored is not limited to the predetermined number of bytes (91 bytes) as long as the storage position of data segment stored in the main memory 15 is adjusted.

The number of bytes of the sync code, the user data, and the correction code data P1 and the correction code data PO may be changed when necessary.

Figure 14:
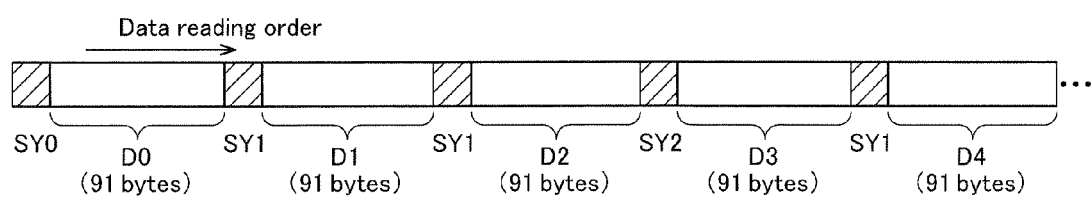
FIG. 14(*a*) is a schematic diagram showing the data structure for an HD-DVD (trademark)
Figure 14:
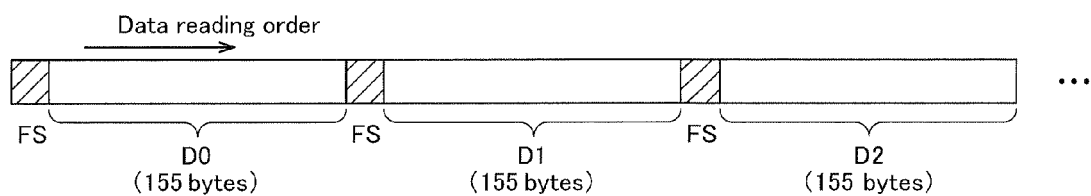

The reproduction device of the above embodiment may be configured to reproduce data of recording media other than a DVD. For example, the recording medium may be a high-definition digital versatile disc, or HD-DVD (trademark). As shown in FIG. 14A, an HD-DVD also includes 91 bytes (i.e., one frame) of read data RD between two sync codes (SY0, SY1, . . . ). The recording medium may also be a Blu-ray Disc (trademark). As shown in FIG. 14B, a Blu-ray Disc includes 155 bytes of read data between two sync codes (FS). The reproduction device of the above embodiment also exhibits a high performance when reproducing data of such recording media.

Although the eight-to-sixteen modulation and the eight-to-sixteen demodulation are performed as the modulation and demodulation processes, other modulation and demodulation processes may be performed.

The defect recording circuit 35 may be eliminated, and read data may be stored through a user setting.

The present examples and embodiments are to be considered as illustrative and not restrictive, and the invention is not to be limited to the details given herein, but may be modified within the scope and equivalence of the appended claims.

What is claimed is:

1. A reproduction device for retrieving read data, including a plurality of sync codes and a plurality of data segments arranged alternately with the sync codes, and for storing the data segments in a first memory in accordance with the sync codes, the reproduction device comprising:
   a detection circuit for detecting each of the sync codes from the read data to generate a detection signal;
   an analysis circuit, coupled to the detection circuit, for analyzing a read status of each of the sync codes with the detection signal to generate an analysis signal; and
   a storage processing circuit, coupled to the analysis circuit, for adjusting, in accordance with the analysis signal, a position at which read data between two sync codes detected by the detection circuit is stored in the first memory, wherein when the analysis signal indicates that an amount of the read data between the two sync codes is not a specified amount, the storage processing circuit
   adjusts, based on one of the two sync codes, a position for storing some portion of the read data between the two sync codes, and
   adjusts, based on the other one of the two sync codes, a position for storing the remaining portion of the read data between the two sync codes.

2. The reproduction device according to claim 1, wherein the analysis circuit counts the read data in response to the detection signal and analyzes the read status of each of the sync codes based on the counting.

3. The reproduction device according to claim 2, wherein:
   the sync codes includes a first sync code and a second sync code; and
   the storage processing circuit adjusts the position at which the one of the data segments between the first and second sync codes, consecutively detected by the detection circuit, is stored in the first memory.

4. The reproduction device according to claim 3, wherein:
   the data segments each have a predetermined number of bytes; and
   the analysis circuit analyzes the read status of the second sync code by determining whether the second sync code has been detected at an expected position relative to the first sync code based on the counting of the read data, and
   the read status of the second sync code is one of:
   a first status indicating that the second sync code has been detected at the expected position, with the one of the data segments between the first and second sync codes having the predetermined number of bytes;

a second status indicating that the second sync code has been detected at a position differing from the expected position, with the one of the data segments between the first and second sync codes being larger than the predetermined number of bytes;

a third status indicating that the second sync code has been detected at a position differing from the expected position, with the one of the data segments between the first and second sync codes being smaller than the predetermined number of bytes; and a fourth status indicating that the second sync code has been undetected in a detection range including the expected position.

5. The reproduction device according to claim 4, wherein when the read status of the second sync code is the first status, the storage processing circuit directly stores the one of the data segments having the predetermined number of bytes in the first memory.

6. The reproduction device according to claim 4, wherein when the read status of the second sync code is the second status, the storage processing circuit:

stores the one of the data segments that is larger than the predetermined number of bytes in a predetermined memory space of the first memory by performing one of a first process for sequentially storing the one of the data segments from a data head adjacent to the first sync code, a second process for storing the one of the data segments sequentially from a data end adjacent to the second sync code, and a third process for combining the first process and the second process; and deletes data that is non-storable in the predetermined memory space.

7. The reproduction device according to claim 4, wherein when the read status of the second sync code is the third status, the storage processing circuit:

stores the one of the data segments that is smaller than the predetermined number of bytes in a predetermined memory space of the first memory by performing one of a first process for storing the one of the data segments sequentially from a data head adjacent to the first sync code, a second process for storing the one of the data segments sequentially from a data end adjacent to the second sync code, and a third process for combining the first process and the second process; and generates dummy data and stores the dummy data in the predetermined memory space to compensate for missing data.

8. The reproduction device according to claim 4, further comprising:

a second memory coupled to the storage processing circuit, wherein when the read status of the second sync code is the fourth status, the storage processing circuit stores the one of the data segments having the predetermined number of bytes and following the first sync code in the second memory.

9. The reproduction device according to claim 1, wherein the data segments are each modulated through a predetermined modulation process, the reproduction device further comprising:

a decoder circuit, coupled to the first memory and the storage processing circuit, for demodulating each of the data segments by performing a demodulation process that is in correspondence with the predetermined modulation process.

10. The reproduction device according to claim 1, wherein the data segments each correspond to one frame, a predetermined number of frames form a data block, and the data block includes user data and correction data for correcting a read error, and wherein the first memory stores the data segments for the predetermined number of frames of the data block, the reproduction device further comprising:

an error correction circuit, coupled to the first memory, for reading the data segments for the predetermined number of frames from the first memory and correcting the read error based on the correction data.

11. The reproduction device according to claim 1, further comprising:

a defect recording circuit for determining from a defect signal that the read data includes a defect and for recording position information indicating the position of the defect, wherein the storage processing circuit uses either one of the analysis signal and the position information to adjust the positions at which the one of the data segments is stored.

12. The reproduction device according to claim 11, wherein:

the defect recording circuit records the number of defects included in the one of the data segments between the two consecutive sync codes; and the storage processing circuit uses the number of defects and the position information or uses the analysis signal to adjust the position at which the one of the data segments is stored.

13. A method for retrieving read data, including a plurality of sync codes and a plurality of data segments arranged alternately with the sync codes, with a reproduction device and for storing the data segments in a first memory in accordance with the sync codes, the method comprising:

detecting each of the sync codes from the read data to generate a detection signal;

generating an analysis signal by analyzing a read status of each of the sync codes with the detection signal; and adjusting, in accordance with the analysis signal, a position at which read data between two sync codes that are detected is stored in the first memory, wherein when the analysis signal indicates that an amount of the read data between the two sync codes is not a specified amount, a position for storing some portion of the read data between the two sync codes is adjusted based on one of the two sync codes, and a position for storing the remaining portion of the read data between the two sync codes is adjusted based on the other one of the two sync codes.

14. The method according to claim 13, wherein said generating an analysis signal includes counting the read data in response to the detection signal and analyzing the read status of each of the sync codes based on the counting.

15. The method according to claim 14, wherein:

the sync codes includes a first sync code and a second sync code; and said adjusting a position at which the one of the data segments is stored includes adjusting the position at which the one of the data segments between the consecutively detected first and second sync codes is stored in the first memory.

16. The method according to claim 15, wherein:

the data segments each have a predetermined number of bytes; and said generating an analysis signal includes analyzing the read status of the second sync code by determining whether the second sync code has been detected at an expected position relative to the first sync code based on the counting of the read data; and the read status of the second sync code is one of:

a first status indicating that the second sync code has been detected at the expected position, with the one of the data segments between the first and second sync codes having the predetermined number of bytes;

a second status indicating that the second sync code has been detected at a position differing from the expected position, with the one of the data segments between the first and second sync codes being larger than the predetermined number of bytes;

a third status indicating that the second sync code has been detected at a position differing from the expected position, with the one of the data segments between the first and second sync codes being smaller than the predetermined number of bytes; and a fourth status indicating that the second sync code has been undetected in a detection range including the expected position.

17. The method according to claim 16, wherein said adjusting a position at which the one of the data segments is stored includes directly storing the one of the data segments having the predetermined number of bytes in the first memory when the read status of the second sync code is the first status.

18. The method according to claim 16, wherein the reproduction device further includes a second memory, and said adjusting a position at which the one of the data segments is stored includes:

storing the one of the data segments having the predetermined number of bytes and following the first sync code in the second memory when the read status of the second sync code is the fourth status.

19. The method according to claim 13, further comprising:

determining from a defect signal that the read data includes a defect; and recording position information indicating the position of the defect;

wherein said adjusting a position at which the one of the data segments is stored includes using either one of the analysis signal and the position information to adjust position at which the data segment is stored.

20. The method according to claim 13, further comprising:

determining from a defect signal that the one of the data segments between the two consecutive sync codes includes defects; and recording the number of defects and position information indicating the positions of the defects;

wherein said adjusting a position at which the one of the data segments is stored includes using the number of defects and the position information or using the analysis signal to adjust the position at which the one of the data segments is stored.

* * * * *